(12) United States Patent
Sundell et al.

(10) Patent No.: US 9,596,634 B2
(45) Date of Patent: Mar. 14, 2017

(54) ASSIST REORDERING OF DOWNLINK DATA AT SERVING GW RELOCATION

(75) Inventors: Hans-Olof Sundell, Kalvsund (SE); Hans-Åke Lund, Bohus (SE); Folke Lars Gunnar Ahlström, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 656 days.

(21) Appl. No.: 13/140,991

(22) PCT Filed: Dec. 16, 2009

(86) PCT No.: PCT/EP2009/067264
§ 371 (c)(1),
(2), (4) Date: Jun. 20, 2011

(87) PCT Pub. No.: WO2010/069985
PCT Pub. Date: Jun. 24, 2010

(65) Prior Publication Data
US 2011/0255471 A1  Oct. 20, 2011

Related U.S. Application Data

(60) Provisional application No. 61/139,231, filed on Dec. 19, 2008.

(51) Int. Cl.
*H04W 36/02* (2009.01)
*H04W 36/12* (2009.01)

(52) U.S. Cl.
CPC ............ *H04W 36/02* (2013.01); *H04W 36/12* (2013.01)

(58) Field of Classification Search
None
See application file for complete search history.

(56) References Cited

U.S. PATENT DOCUMENTS

| 6,963,582 | B1 * | 11/2005 | Xu ................................ 370/466 |
| 8,045,522 | B2 * | 10/2011 | Wang et al. .................. 370/331 |
| 8,179,846 | B2 * | 5/2012 | Dolganow et al. ........... 370/329 |
| 8,228,892 | B2 * | 7/2012 | Takahashi et al. ........... 370/350 |
| 2005/0265284 | A1 * | 12/2005 | Hsu et al. ..................... 370/331 |
| 2011/0255471 | A1 * | 10/2011 | Sundell et al. ............... 370/328 |

(Continued)

OTHER PUBLICATIONS

Farinacci et al., RFC 2784, "Generic Routing Encapsulation (GRE)", p. 1-9, Mar. 2000.*

(Continued)

*Primary Examiner* — Gregory Sefcheck

(57) ABSTRACT

A packet data network gateway (PDN-GW) on a wireless telecommunications network having a target radio access network (RAN) and a Serving (GW) includes a processing unit which generates an end marker packet The PDN-GW includes a network interface which sends the end marker packet onto the network to assist the target RAN in reordering of downlink data. A method for a packet data network gateway (PDN-GW) on a wireless telecommunications network having a target radio access network (RAN) and a Serving (GW) includes the steps of generating an end marker packet with a processing unit. There is the step of sending the end marker packet onto the network with a network interface to assist the target RAN in reordering of downlink data.

6 Claims, 4 Drawing Sheets

(56) References Cited

U.S. PATENT DOCUMENTS

2012/0201222 A1* 8/2012 Muhanna et al. ............ 370/331
2012/0294276 A1* 11/2012 Jaiswal et al. ............... 370/331
2012/0294277 A1* 11/2012 Jaiswal et al. ............... 370/331

OTHER PUBLICATIONS

CATT: "End marker during Handover procedure with Serving GW change" 3GPP Draft: S2-085423, 3rd Generation Partnership Project (3GPP), Mobile Competence Centre , 650, Route Des Lucioles , F-06921 Sophia-Anti Poiis Cedex 7 France, vol. SA WG2, no. Sophia, 20080618, Aug. 19, 2006 (Aug. 19, 2006). XP050267456 [retrieved on Aug. 19, 2008] the whole document.

CATT: "End marker during Handover procedure with Serving GW change" 3GPP Draft: S2-083628, 3rd Generation Partnership Project (3GPP), Mobile Competence Centre ; 650, Route Des Lucioles ; F-06921 Sophia-Antipolis Cedex ; France, vol. SA WG2. no. Prague: 20080502, May 2, 2008 (May 2, 2008), XP050265831.

3GPP: 3GPP TS 23.401 V8.4.1; General Packet Radio Service (GPRS) enhancements for Evolved Universal Terrestrial Radio Access Network (E-Utran) access (Release 8) 3GPPTS 23.401 V8.4.1 Dec. 18, 2008 (Dec. 18, 2008), pp. 1,117-122, XP002587996 Retrieved from the Internet: URL:http://www.3gpp.org/ftp/Specs/archive/23_series/23.401/> [retrieved on Feb. 11, 2010] p. 117, paragraph 5.5.2.0 p. 120. paragraph 5.5.2.1.3-p. 122, paragraph 5.5.2.1.3 figures 5.5 2.1 3-1.

\* cited by examiner

ASSIST REORDERING OF DOWNLINK DATA AT SERVING GW RELOCATION

This application claims the benefit of U.S. Provisional Application No. 61/139,231, filed Dec. 19, 2008, the disclosure of which is fully incorporated herein by reference.

TECHNICAL FIELD

The present invention is related to a packet data network gateway (PDN-GW) on a wireless telecommunications network having a target radio access network (RAN) and a Serving (GW) which generates an end marker packet and sends the end marker packet onto the network to assist the target RAN in reordering of downlink data. (As used herein, references to the "present invention" or "invention" relate to exemplary embodiments and not necessarily to every embodiment encompassed by the appended claims.) More specifically, the present invention is related to a packet data network gateway (PDN-GW) on a wireless telecommunications network having a target radio access network (RAN) and a Serving (GW) which generates an end marker packet and sends the end marker packet onto the network to assist the target RAN in reordering of downlink data after receiving an update bearer request message which indicates the Serving GW will switch from a source Serving GW to a target Serving GW.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

In the current 3GPP standard, TS 23.401 version 8.3.0, it is specified that the Serving GW shall generate an "end marker" packet, see FIG. 1, to assist the target eNodeB to perform reordering of downlink packets to the UE. FIG. 1 shows handover without serving GW relocation.

1. The target eNodeB sends a Path Switch Request message to MME to inform that the UE has changed cell, including the ECGI of the target cell and the list of rejected EPS bearers. The MME determines that the Serving GW can continue to serve the UE 2. The MME sends a User Plane Update Request (eNodeB address(es) and TEIDs for downlink user plane for the accepted EPS bearers) message to the Serving GW.

In case any EPS bearers are to be released the MME triggers the bearer release procedure as specified in clause 5.4.4.2.

3. The Serving GW starts sending downlink packets to the target eNodeB using the newly received address and TEIDs. A User Plane Update Response message is sent back to the MME.

4. In order to assist the reordering function in the target eNB, the Serving GW shall send one or more "end marker" packets on the old path immediately after switching the path as defined in TS 36.300 [5], clause 10.1.2.2.

In the EPS, it is also possible to have the target RAN, e.g. target eNodeB, connected to a target Serving GW, see FIG. 2. During the handover procedure the Serving GWs must also be changed. This means the "end marker" packets generation by the current solution will not work correctly. In fact no "end marker" will be generated in case of Serving GW relocation. FIG. 2 shows handover with serving GW relocation.

SUMMARY

The present invention pertains to a packet data network gateway (PDN-GW) on a wireless telecommunications network having a target radio access network (RAN) and a Serving (GW). The PDN-GW comprises a processing unit which generates an end marker packet The PDN-GW comprises a network interface which sends the end marker packet onto the network to assist the target RAN in reordering of downlink data.

The present invention pertains to a method for a PDN-GW on a wireless telecommunications network having a target RAN and a Serving (GW). The method comprises the steps of generating an end marker packet with a processing unit. There is the step of sending the end marker packet onto the network with a network interface to assist the target RAN in reordering of downlink data.

BRIEF DESCRIPTION OF THE DRAWINGS

In the accompanying drawings, the preferred embodiment of the invention and preferred methods of practicing the invention are illustrated in which.

DETAILED DESCRIPTION

Figure 4:
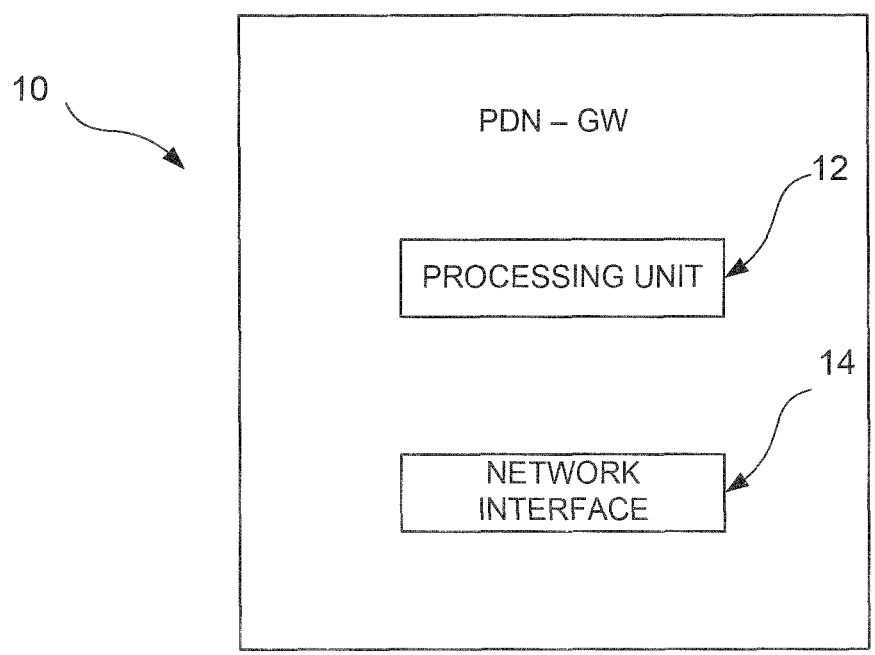
FIG. 4 is a block diagram of a packet data network gateway of the present invention.

Referring now to the drawings wherein like reference numerals refer to similar or identical parts throughout the several views, and more specifically to FIG. 4 thereof, there is shown a packet data network gateway 10 (PDN-GW) on a wireless telecommunications network having a target radio access network (RAN) and a Serving (GW). The PDN-GW 10 comprises a processing unit 12 which generates an end marker packet The PDN-GW 10 comprises a network interface 14 which sends the end marker packet onto the network to assist the target RAN in reordering of downlink data.

The network interface 14 may receive an update bearer request message which indicates the Serving GW will switch from a source Serving GW to a target Serving GW. The network interface 14 may send the end marker packet onto the network to the source Serving GW. The network interface 14 may send the end marker packet onto the network to the source Serving GW on an old path and may send downlink data onto the network on a new path after the end packet is sent.

The network interface 14 may send the end marker packet onto the network to the Serving GW using general packet radio service (GPRS) Tunnelling Protocol (GTP). The network interface 14 may send the end marker packet onto the network to the Serving GW using generic routing encapsulation (GRE). The network interface 14 may send the end marker packet onto the network to the Serving GW using S1 based Handover. The network interface 14 may send the end marker packet onto the network to the Serving GW using inter-radio access technologies (IRAT) handover. The network interface 14 may send the end marker packet onto the network to the Serving GW using X2-based Handover with SGW relocation.

The present invention pertains to a method for a PDN-GW 10 on a wireless telecommunications network having a target RAN and a Serving GW. The method comprises the steps of generating an end marker packet with a processing unit 12. There is the step of sending the end marker packet onto the network with a network interface 14 to assist the target RAN in reordering of downlink data.

There can be the step of receiving an update bearer request message at the network interface 14 which indicates the Serving GW will switch from a source Serving GW to a target Serving GW. The sending step can include the step of sending from the network interface 14 the end marker packet onto the network to the source Serving GW. The sending step can include the steps of sending from the network interface 14 the end marker packet onto the network to the source Serving GW on an old path and sending downlink data onto the network on a new path after the end packet is sent.

The sending step may include the step of sending the end marker packet from the network interface 14 onto the network to the Serving GW using general packet radio service (GPRS) Tunnelling Protocol (GTP). The sending step may include the step of sending the end marker packet from the network interface 14 onto the network to the Serving GW using generic routing encapsulation (GRE). The sending step may include the step of sending the end marker packet from the network interface 14 onto the network to the Serving GW using S1 based Handover. The sending step may include the step of sending the end marker packet from the network interface 14 onto the network to the Serving GW using X2-based Handover with SGW relocation. The sending step may include the step of sending the end marker packet from the network interface 14 onto the network to the Serving GW using inter-radio access technologies (IRAT) handover.

In the operation of the invention, to be able to have the advantage of the "end marker" packet to assist the target RAN in the reordering function, in case of Serving GW relocation, the generator of such a packet must be higher up in the network. This invention specifies that the PDN-GW 10 will do the generation of the "end marker" packet.

Figure 1:
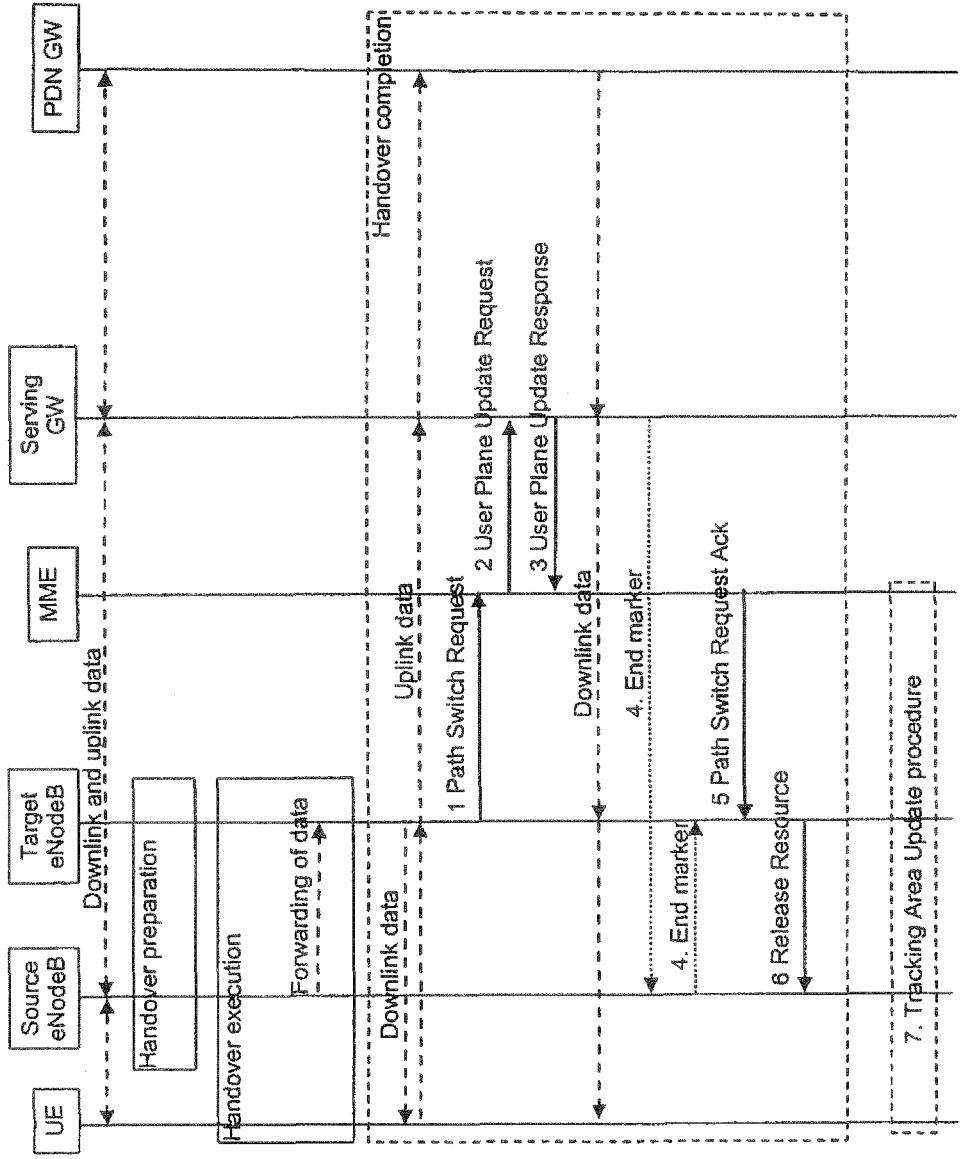
FIG. 1 shows handover without serving GW relocation.
Figure 2:
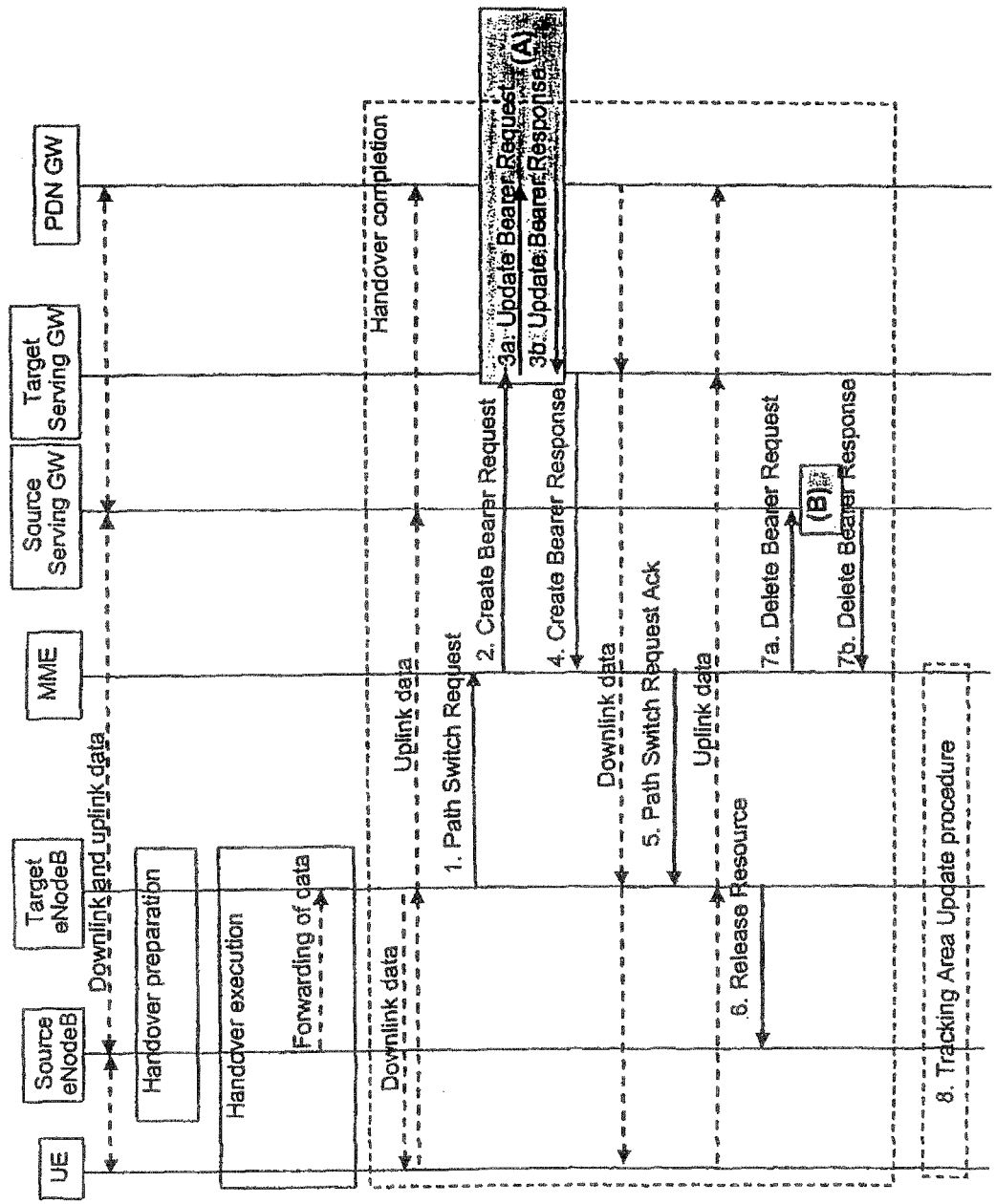
FIG. 2 shows handover with serving GW relocation.
Figure 3:
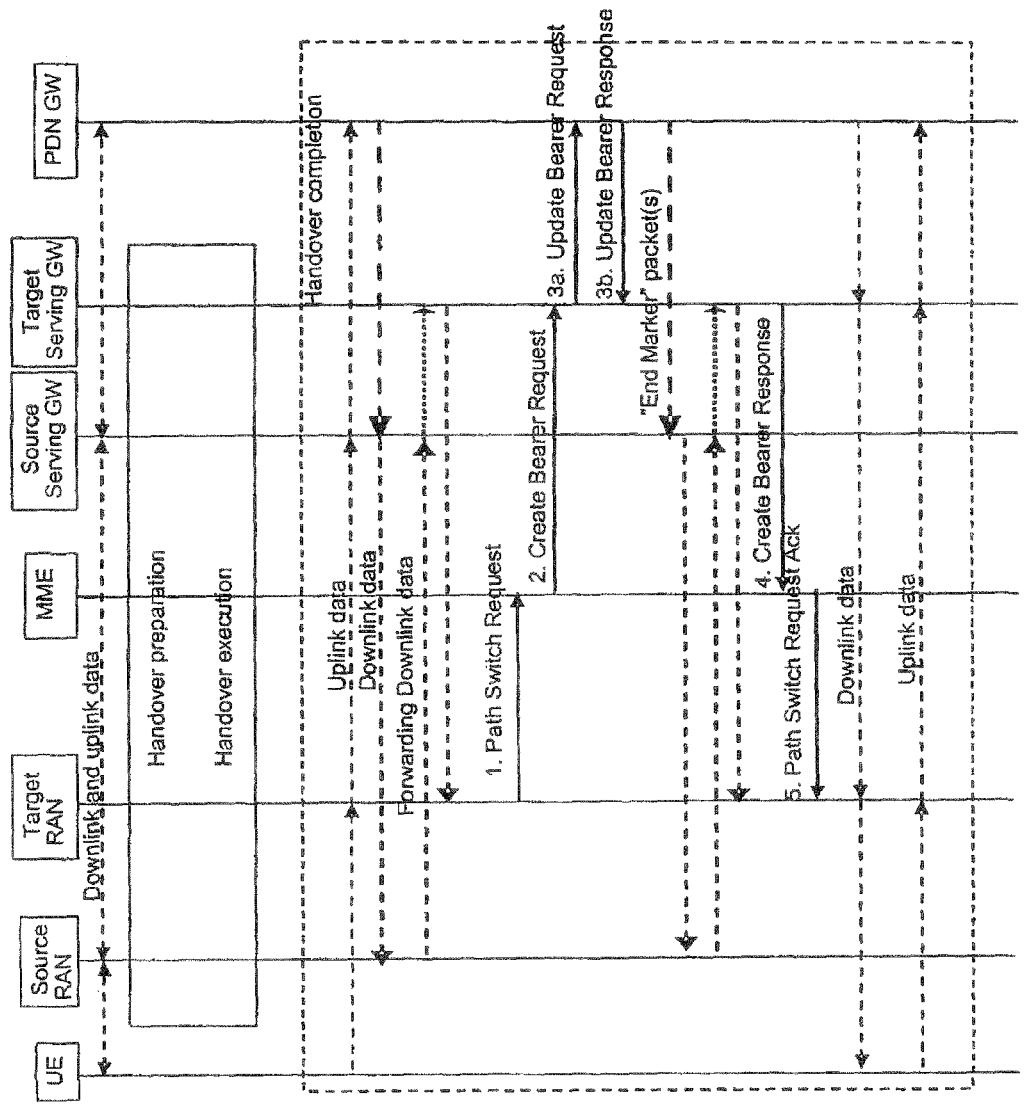
FIG. 3 shows handover with serving GW relocation, end marker packet.

In the handover procedure, the signalling diagram of FIG. 3 is applicable:

FIG. 3 shows handover with serving GW relocation, end marker packet.
  Note: The source RAN may be a eNodeB, RNC or BSS, and the same for the target RAN.
  Note: All required signalling to complete a handover procedure is not shown in FIG. 3; see 3GPP TS 23.401 for completeness.
  Note: The X2 handover with Serving GW relocation scenario is used to describe the invention but the invention is applicable for all handover scenarios with Serving GW relocation.

When the PDN GW receives the message "Update Bearer Request" in Step 3a, the PDN GW knows that the Serving GW will be switch from source Serving GW to target Serving GW. At that point the PDN GW shall generate at least one "End Market" packet and send those packets on the old path, i.e. to the source Serving GW. The source Serving GW will see this end-marker packet and just forward it to the source RAN. The source RAN will forward it to its forwarding node, i.e. the Serving GW (source or target depending configuration). The Serving GW just forward it to the Target RAN. The target RAN will then detect that this is a "End Marker" packet and by that it will discard all packets received on that path from this moment and start forwarding the packets on the normal downlink path from the target Serving GW.

The description above does mainly apply to when the interface between PDN GW and Serving GW is using GTP. For GTP user traffic tunnels there exist an end marker packet format to be used between Serving GW and eNodeB (S1-U interface) and between eNodeBs (X2 interface), the same end marker packet may be used between PDN GW and Serving GW.

If PMIPv6 is used between PDN GW and Serving GW the user payload tunnel between the two nodes is using GRE instead of GTP. In GRE no end marker packet format is defined in IETF standards but it is rather simple to define an end-marker packet format in the GRE header.

A possible solution would be to use the GRE header field "Reserved0 (bits 1-12)" and set any of the bits 1-5 to one to indicate that it is an end marker packet. According to RFC 2784 section 2.3, a packet with any of the Reserved0 bits 1-5 set to one must be discarded. By using these bits to indicate end-marker it is ensured that an implementation that is not aware of end-markers will simply discard the packet.

Some other solutions have been considered but the proposed solution described above is considered to be superior:
  The PDN GW sends, at step 3b, a signal (yet to be defined) to the source Serving GW to indicate that an "end marker" shall be generated. This solution was rejected since it will probably not work for PMIP based S5.
  The target Serving GW generates, at the reception of step 3b, an "end marker". This solution was rejected since it cannot be certain that the "end marker" is generated after all downlink packets are transferred through the source Serving GW.
  The target Serving GW sends, at the reception of step 3b, a signal (yet to be defined) to the source Serving GW to indicate that an "end marker" shall be generated. This solution was rejected since it requires a new interface (between Serving GWs).

This invention will assist the target RAN for reordering of downlink data even if the Serving GW is changed during the handover procedure. The reason is that the "End Marker" packet(s) is generated in the node where the UE is anchored (IP point of present). By this, the downlink data on the new path from the PDN GW is sent after the "End Marker" packet is sent on the old path.

The advantage for using end-markers all the way from the anchor point down to the eNodeB is that the probability of receiving packets in order in the mobile increases and the probability of packet drop decreases.

Another advantage with the invention is that it only affects the PDN GW. Thus, it needs limited support from Serving GW and no support from other nodes and may, if standardisation fails, be implemented as a sticky feature.

Abbreviations:
  GW: Gateway,
  PDN: Packet Data Network
  TS: Technical Specification
  UE: User Equipment
  MME: Mobility Management Entity
  TEID: Tunnel Endpoint Identifier
  ECGI: E-UTRAN Cell Global Identifier
  E-UTRAN: Evolved Universal Terrestrial Radio Access Network
  EPS: Evolved Packet System
  RAN: Radio Access Network
  RNC: Radio Network Controller
  BSS: Base Station Subsystem
  GTP: GPRS Tunnelling Protocol Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A method for a packet data network gateway (PDN-GW) on a wireless telecommunications network having a target radio access network (RAN) and a serving gateway (GW) comprising the steps of:
generating an end marker packet with a processing unit after receiving an update bearer request message at a network interface which indicates the serving GW will switch from a source serving GW to a target serving GW; and
sending the end marker packet onto the network with the network interface to the source serving GW then to a source RAN, then to the target serving GW and then to the target RAN using generic routing encapsulation (GRE) where any one of bits of a GRE header field reserved to indicate to discard the end marker packet is set to a value of one to indicate the end marker packet is an end marker packet to assist the target RAN in reordering of downlink data.

2. The method as described in claim 1 comprising the step of receiving the update bearer request message at the network interface which indicates the serving GW will switch from the source serving GW to the target serving GW.

3. The method as described in claim 1 wherein the step of sending includes the steps of sending from the network interface the end marker packet onto the network to the source serving GW on an old path and sending downlink data onto the network on a new path after the end marker packet is sent.

4. A packet data network gateway (PDN-GW) on a wireless telecommunications network having a target radio access network (RAN) and a serving gateway (GW) comprising:
a processing unit which generates an end marker packet after receiving an update bearer request message at a network interface which indicates the serving GW will switch from a source serving GW to a target serving GW; and
wherein the network interface sends the end marker packet onto the network to assist the target RAN in reordering of downlink data, and wherein the network interface sends the end marker packet onto the network to the source serving GW then to a source RAN, then to the target serving GW and then to the target RAN using generic routing encapsulation (GRE) where any one of bits of a GRE header field reserved to indicate to discard the end marker packet is set to a value of one to indicate the end marker packet is an end marker packet.

5. The PDN-GW as described in claim 4 wherein the network interface receives the update bearer request message which indicates the serving GW will switch from the source serving GW to the target serving GW.

6. The PDN-GW as described in claim 4 wherein the network interface sends the end marker packet onto the network to the source serving GW on an old path and sends downlink data onto the network on a new path after the end marker packet is sent.

* * * * *